United States Patent [19]
de Groot

[11] Patent Number: 5,488,477
[45] Date of Patent: Jan. 30, 1996

[54] METHODS AND APPARATUS FOR PROFILING SURFACES OF TRANSPARENT OBJECTS

[75] Inventor: Peter de Groot, Middletown, Conn.

[73] Assignee: Zygo Corporation, Middlefield, Conn.

[21] Appl. No.: 153,146

[22] Filed: Nov. 15, 1993

[51] Int. Cl.⁶ .................................................. G01B 9/02
[52] U.S. Cl. .................................................. 356/359
[58] Field of Search .................................. 356/359, 360, 356/349

[56] References Cited

U.S. PATENT DOCUMENTS

| | | | |
|---|---|---|---|
| 4,201,473 | 5/1980 | Domenicali | 356/360 |
| 4,594,003 | 6/1986 | Sommargren | 356/359 |
| 4,869,593 | 9/1989 | Biegen | 356/351 |
| 4,872,755 | 10/1989 | Kuchel | 356/360 |
| 5,033,855 | 7/1991 | Matsui | 356/359 |
| 5,146,293 | 9/1992 | Mercer et al. | 356/360 |

OTHER PUBLICATIONS

Katsuyuki Okada, et al., Separate measurements of surface shapes and refractive index inhomogeneity of an optical element using tunable-source phase shifting interferometry, Applied Optics, vol. 29, No. 22, 1 Aug. 1990, pp. 3280–3285.

*Primary Examiner*—Samuel A. Turner
*Attorney, Agent, or Firm*—Cohen, Pontani, Lieberman & Pavane

[57] ABSTRACT

An optical system for measuring the front and back surface topography of transparent objects with substantially parallel surfaces includes an interferometer, an electronic camera, and digital signal processing means for determining surface height from interference data. The several disclosed methods of the invention permit the mathematical separation of the interference contributions due to the multiple reflections from the two parallel surfaces of the object. These methods involve relatively simple procedures, such as reversing the orientation of the object between two successive interference measurements, followed by mathematical analysis or calculations that may be readily performed by computer. The preferred apparatus includes a tunable laser source that is used to remove undesirable artifacts and improve the quality of the final image.

31 Claims, 3 Drawing Sheets

FIG. 3
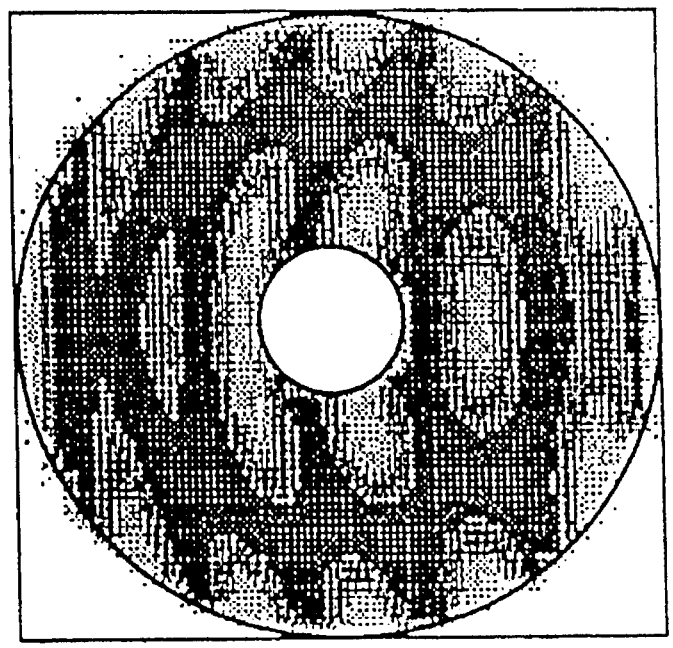
INTENSITY
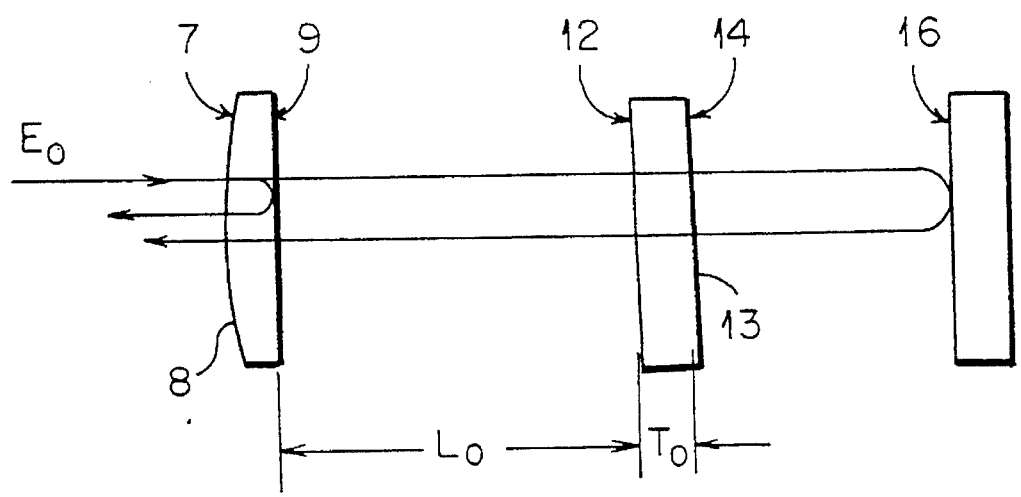
FIG.4

METHODS AND APPARATUS FOR PROFILING SURFACES OF TRANSPARENT OBJECTS

FIELD OF THE INVENTION

The invention relates generally to precision optical metrology instrumentation for imaging and analysis of surfaces and, more particularly, to interferometers for surface profiling.

BACKGROUND AND PRIOR ART

Among the widely-used instruments for measuring surface topographies are interferometers, which use the wave nature of light to map variations in surface height with a high degree of accuracy. However, when a transparent flat plate with parallel surfaces is illuminated with a laser-based interferometer, the resulting interference pattern is a complex mixture of fringes created by reflections from both the front and back surfaces of the plate. In order to do meaningful metrology on such an object, the common practice is to either thinly coat the front surface with a high reflectivity material, or to defeat the back-surface reflection by applying some kind of index-matching coating. It would be desirable to dispense with these kinds of surface treatments for regular inspection and testing, particularly for process control in a production environment.

Measurement problems relating to multiple or spurious reflections in interferometers are well known. In an article entitled Digital Wave-Front Measuring Interferometry. Some Systematic Error Sources, by J. Schwider, et al., 22 Applied Optics 3421 (1983), the deleterious effects of spurious reflections are described in some detail. More recently, an article entitled Testing An Optical Window Of A Small Wedge. The Effect Of Multiple Reflections, by C. Ai and J. C. Wyant, 32 Applied Optics 4904 (1993), discussed the problem of compound reflections between the front and back sides of a transparent flat object during a transmitted-wavefront test. However, these articles and many other articles and patents related to optical metrology do not teach specific apparatus and means for measuring the surface height variations of transparent objects having approximately parallel flat surfaces. Substantially the same difficulty arises when working with transparent objects having approximately concentric spherical surfaces, such as domes and contact lenses.

The generally accepted prior art principle is that transparent objects that produce multiple reflections in interferometers can only be accurately measured if one or the other of the reflections is greatly reduced or eliminated by treating the surface in question, or by employing a more complex optical geometry. For example, several prior-art techniques that reduce the effect of multiple reflections employ spatially incoherent sources or extreme angles of illumination, such as is described in U.S. Pat. No. 4,325,637, entitled Phase Modulation Of Grazing Incidence Interferometer, to R. C. Moore. These techniques, however, generally sacrifice measurement accuracy, optical simplicity, ease of use and cost.

There is accordingly an unmet need for an accurate and convenient method and apparatus for obtaining surface profiles of transparent objects.

OBJECTS OF THE INVENTION

It is accordingly a principal object of the present invention to provide a method and apparatus for determining, with a high degree of accuracy, the topography of the front and back sides of a transparent flat object having approximately parallel surfaces.

It is a further object of the invention to provide an interferometric method and apparatus for measuring the surface topography of transparent parts that cannot, due to multiple reflections from the two surfaces of the part, be conveniently measured by conventional interferometric means.

It is another object of the invention to interferometrically measure the surface topography of transparent objects without suffering the deleterious inherent effects of multiple reflections, including systematic measurement errors, phase distortion and poor measurement repeatability due to low fringe contrast.

A still further object of the invention is to accurately measure the surface topography of transparent parts without first treating or contacting the surface in any way.

Yet another object of the invention is to accurately measure the topography of the front and back sides of transparent pans having approximately concentric spherical surfaces.

SUMMARY OF THE INVENTION

In accordance with various methods of the invention, and apparatus for practicing and accomplishing the same, a Fizeau or like interferometer is utilized to measure the reflected wavefront from a transparent object having approximately parallel surfaces. The measured wavefront is the result of the combined reflections from both the front and the back surfaces of the object. After a first wavefront measurement, one or more additional wavefront measurements are performed with the object either in a different orientation or with the source adjusted to a different wavelength. The resulting two or more wavefront measurements are then mathematically analyzed, as in a computer or other digital signal processing apparatus or the like, to calculate the surface topographies of the front and back surfaces of the transparent object.

The inventive methodology for determining the front and back surface profiles of a transparent object further consists, therefore, in the manner of inventive analysis of the multiple interference phase images. Each phase image, which is representative of the reflected wavefront, is obtained under different conditions, carefully chosen so that only one possible combination of surface topographies is consistent with the resulting set of images. For example, in accordance with one method of the invention, the test object is first imaged with its front surface facing the interferometer, and is then imaged with its back surface facing the interferometer. The images are thereafter analyzed, as by a computer or computer-based analyzer, to separate out the contributions from each of the surfaces of the object.

Several different specific methods or combinations of measurements are disclosed below, by way of explanatory example, in the following Detailed Description Of The Preferred Embodiments. For at least some of these methods, the advantageous functionality of the invention may be fully realized utilizing substantially conventional metrology apparatus for generating the phase images. In addition, the invention provides preferred apparatus for implementing all of the various methods herein described, including in particular those methods requiring a variable wavelength source, which is not normally a feature of conventional metrology apparatus.

BRIEF DESCRIPTION OF THE DRAWINGS

In the drawings, wherein like reference characters denote similar elements throughout the several views:

FIG. 3 is a mathematically-generated interference pattern for a Fizeau-type interferometer and a transparent glass disk;

FIG. 4 is a diagrammatic depiction of an interferometer cavity showing a suitable geometry for implementing the inventive transmission test for measuring the optical thickness nT, with the object placed between two reference flats;

DETAILED DESCRIPTION OF THE PREFERRED EMBODIMENTS

As pointed out hereinabove in the Summary Of The Invention, the inventive method for obtaining surface profiles of the front and back surfaces of a transparent object may be broadly described as the generating of two or more independent phase images for different measurement configurations or geometries, and the subsequent analysis or computer processing of these independent phase images to render the final surface height maps. This first portion of the Detailed Description provides a discussion of a preferred apparatus for generating the required phase images in accordance with the invention.

Figure 1:
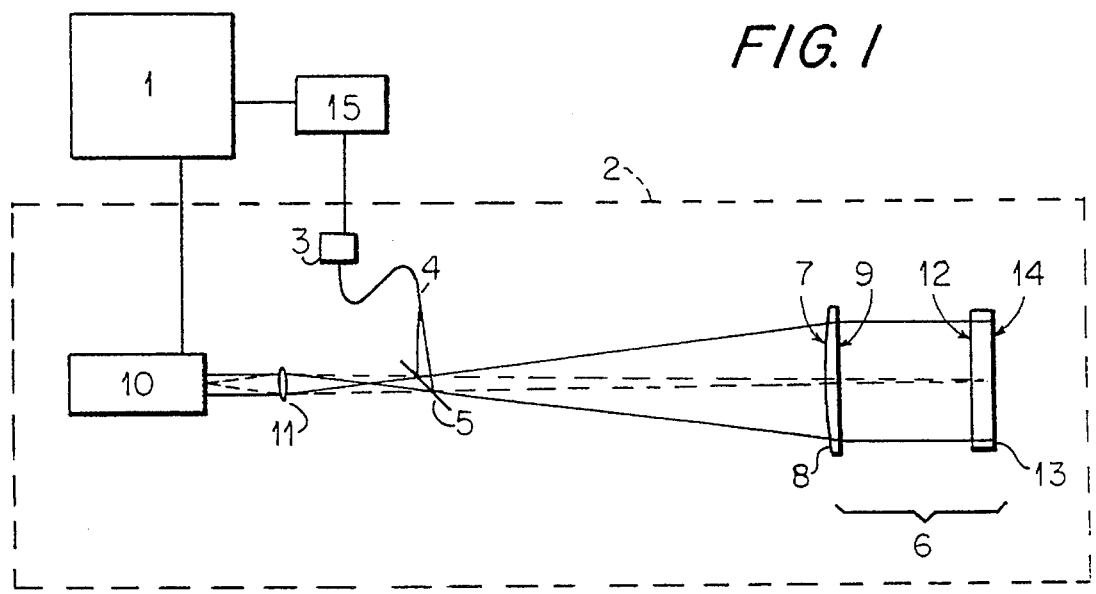
FIG. 1 is a diagrammatic representation of a preferred embodiment of a Fizeau-type apparatus for carrying out the methods of the present invention.

FIG. 1 shows the basic elements of a preferred embodiment of an apparatus constructed in accordance with the invention, which is comprised principally of a computer-based controller and data analysis device 1 and an interferometer 2 of the well-known Fizeau geometry. The alternative use of optically-equivalent interferometer geometries, such as the so-called Michelson or Twyman Green types, is also within the intended scope of this disclosure.

The interferometer is illuminated by an optically coherent source 3—i.e. a source having sufficient spectral and spatial purity for performing interferometry with the Fizeau geometry shown in FIG. 1. Source 3 may be a laser of any of the common or otherwise utilized or suitable forms known in the art, although in the preferred embodiment of the inventive apparatus herein described it is a wavelength-tunable device, such as a semiconductor laser diode, which is coupled to the optical system by means of a single mode fiber 4. Light from the source 3 is reflected from a beam splitter 5 and directed to the Fizeau interferometer cavity 6. The light is collimated by the convex surface 7 of a plano-convex lens 8. The plano side 9 of lens 8 serves as a reference surface, and reflects a portion of the light backwards through the beam splitter to a camera 10 via the imaging lens 11. Camera 10 may be a standard video, CCD or like device for generating electronic images representative of light intensity. A portion of the light passing through the lens 8 is reflected from both the front side 12 and the back side 14 of a transparent object 13 having approximately parallel plane surfaces. The object 13 is the transparent test object or article whose surfaces are to be profiled or topographically measured in accordance with the invention. The light reflected from the object 13 is transmitted back through the beam splitter 5 to the camera 10, where it interferes with the light reflected from the reference surface 9. The interference phenomena results in an intensity distribution that is measured by camera 10 and electronically transferred to the analyzer 1.

The interferometer 2 is used to measure the characteristics of the light reflected from the object 13, specifically the phase profile of the reflected wavefront. This is preferably achieved by phase shift interferometry (PSI), as is for example described in Chapter 14 of the book Optical Shop Testing, edited by Daniel Malacara (Wiley, N.Y., 1992). Intensity images are stored in the analyzer 1 for a sequence of three or more equally-spaced phase shifts. These intensity images are then processed to generate an accurate phase image representative of the wavefront reflected from the transparent object. In the preferred embodiment of the inventive apparatus, the phase shifting is achieved by tuning the wavelength of the source 3 in FIG. 1, as for example in accordance with the method taught by Sommagren in U.S. Pat. No. 4,594,003 entitled Interferometric Wavefront Measurement. The wavelength tuning is performed automatically through a computer-controlled laser diode power supply 15. Wavelength tuning is employed as an aspect of several of the methods herein taught in accordance with the invention, as will become apparent as this description proceeds.

A MATHEMATICAL MODEL OF IMAGE FORMATION

In order to facilitate a clear and complete understanding of the underlying principles of the invention, the following discussion relates the optical principles involved in the interferometry of transparent objects.

Figure 2A:
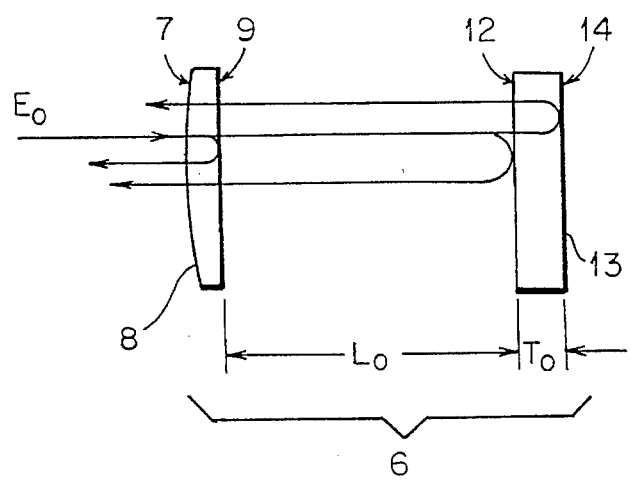
FIG. 2A is an enlarged diagrammatic depiction of the interferometer cavity of the apparatus of FIG. 1.

Shown in additional detail in FIG. 2A is the interferometer cavity 6 formed of the three active surfaces 9, 12 and 14 having respective amplitude reflectivities $r_r$, $r_1$ and $r_2$. The test object 13 has a refractive index n, while the surrounding medium is assumed to have a refractive index very nearly equal to one. The surfaces are characterized by respective height maps $h_r$, $h_1$ and $h_2$ that are a function of coordinates x,y in a plane perpendicular to the axis of the cavity. The reference height map $h_r$ of the surface 9 may be taken as known or easily measured. The purpose of the invention is to generate the height maps $h_1$, $h_2$ for the front and back sides 12 and 14 of transparent object 13. These height maps are also sometimes referred to by synonymous terms such as surface topography, surface height variation and profile, and are measured with respect to the planes depicted by the dotted lines in FIG. 2.

Thus the distance from a point on the reference surface 9 to a corresponding point on the front surface 12 of the test object 13 is $$L(x,y)=L_0+h_1(x,y)-h_r(x,y), \quad \text{Equation 1}$$

while the distance from the from 12 to the back 14 of object 13 is $$T(x,y)=T_0 \cdot h_2(x,y)-h_1(x,y). \quad \text{Equation 2}$$

The variable T will be referred to herein as the thickness map of the object 13. For the remainder of this section, the coordinate arguments (x,y) will not be written explicitly in order to simplify the appearance of the equations.

A consideration of the simplest case will assist in an understanding and appreciation of the problem. Assume that all of the cavity walls have the same reflectivity r and, furthermore, that this reflectivity is very small. An electric field $E_0$ incident from the left is reflected by the three surfaces in succession, but with different phase delays. The reflected electric field E in the weak-reflection limit may therefore be written as $$E=rE_0 \cdot [\exp(2ik \cdot h_r)+\exp(2ik \cdot (h_r+L))+ \exp(2ik \cdot (h_r+L+nT))]. \quad \text{Equation 3}$$

Factoring out the common phase factor yields $$E=rE_0 \cdot [\exp(2ik \cdot h_r) \cdot [1+\exp(2ik \cdot L)+\exp(2ik \cdot (L+nT))]. \quad \text{Equation 4}$$

When viewed by a square-law detector, the measured intensity is $$I=E^* \cdot E=I_0 \cdot \{3+2 \cdot \cos(2k \cdot L)+2 \cdot \cos(2k \cdot nT)+2 \cdot \cos(2k \cdot (L+nT))\}. \quad \text{Equation 5}$$

Setting $I_0=I$ and combining together the second and fourth terms in brackets, we obtain the following relatively simple relationship defining the measured intensity:

$$I=\alpha(nT)+\beta(nT) \cdot \cos(k \cdot (2L+nT)), \quad \text{Equation 6}$$

where $$\alpha(nT)=3+\cos(2k \cdot nT) \quad \text{Equation 7}$$

and $$\beta(nT)=4 \cdot \cos(k \cdot nT). \quad \text{Equation 8}$$

The results of an example calculation, using these formulae for the case of a circular glass disk approximately 75 mm in diameter and 0.5 mm thick with a 20 mm diameter hole in the center, is shown in FIG. 3. In this calculation, one side of the disk is assumed to be flat, and the other has a small amount of second-order curvature. The reference surface 9 is tilted slightly to introduce vertical fringes. As expected, the resulting fringe pattern is far more complex than a normal fringe pattern produced by a single test surface. In particular, the otherwise vertical fringes attributable to the tilt in the reference surface are twisted by the variation in object thickness, and destructive interference between the front and back surfaces of the transparent test object or disk produces circular regions of zero fringe modulation. FIG. 3 also shows the presence of a phase distortion shift between regions of high fringe modulation.

The fringe pattern shown in FIG. 3 cannot be used directly to calculate surface heights. The reflections from the two substantially parallel surfaces of the test disk both contribute to the interference effect and their individual effects cannot be separated solely through analysis of the fringe pattern in FIG. 3. There is, more particularly, no way to determine that one side of the disk is flat and the other has second-order curvature. For this reason, the conventional testing procedure now generally accepted and employed in the art is to coat one of the test object surfaces with a special index-matching film to reduce the reflection from that surface. As previously pointed out, however, this coating method has many practical disadvantages including lost time for preparation, surface damage and contamination, and measurement artifacts resulting from imperfect matching of the refractive indices. An alternative method known in the art, which consists of measuring the object at an extreme angle to permit separation of the reflections, exhibits greatly reduced accuracy when compared with conventional interferometric methods.

THE INVENTIVE MEASUREMENT PRINCIPLE AND PROCEDURE

It will now be demonstrated that the inventive apparatus and method, which are based on a sequence of phase-shift measurements, permit the measurement of the front and back faces or surfaces of a transparent object without requiring, as in the heretofore-known procedures, that those surfaces first be coated or otherwise treated.

Phase images in PSI are usually recovered by varying the distance $L_O$ in a precisely-controlled fashion. Looking at Equation (6) we see that this type of modulation does not effect the coefficients $\alpha$ or $\beta$, which may therefore be considered to be constants in time. If $T \gg L_O$—which is generally the case for most objects and working distances in Fizeau interferometers—it can also be said that the coefficients $\alpha$ or $\beta$ are essentially constant for phase-shifting methods based on small changes in the source wavelength. Thus, for most cases, the quantity $\alpha(x,y)$ is simply a map of DC offsets, and $\beta(x,y)$ is a map of modulation depths, also commonly referred to as the fringe contrasts. The PSI-measured phase $\phi$ corresponds directly to the argument of the cosine that appears explicitly in Equation 6.

One complication in this is that when $\beta$ changes sign, the apparent phase $\phi$ jumps by $\pi$. To take this into account, we will define a function $\Phi(nT)$ by $$\Phi(nT) = \begin{bmatrix} 0 \text{ for } \beta(nT) \geq 0 \\ -1 \text{ for } \beta(nT) < 0 \end{bmatrix} \quad \text{Equation 9}$$

Now we can rewrite Equation 6 in the form $$I=\alpha(nT)+|\beta(nT)| \cdot \cos(\phi), \quad \text{Equation 10}$$

where $$\phi(x,y)=k \cdot (2L+nT)+\pi \cdot \Phi(nT). \quad \text{Equation 11}$$

The phase $\phi$ is what PSI would measure for identical, weakly-reflecting surfaces.

Disregarding the $\Phi$ term for the moment, it can be seen that the phase map conforms in some sense to the average of the two surface height maps. The two distances L and T together create a net phase $\phi$. This demonstrates that there is indeed no obvious way to extract two surface height maps from a single PSI phase map. However, the variables L and T in Equation 11 appear in a simple linear combination, and it is possible to separate them in accordance with the teachings of the present invention.

What now follows is a discussion of four different methods, presented by way of preferred but noninclusive example, that may be used to recover front- and back-surface height maps from PSI measurements without first treating the test object. Once again, for mathematical clarity, only the simplest case of three identical, weakly-reflecting surfaces will be analyzed in detail. However, those skilled in the art will immediately appreciate that these methods have general applicability, as will be expressly demonstrated further hereinbelow.

METHOD 1: THE FLIP TEST

Figure 2B:
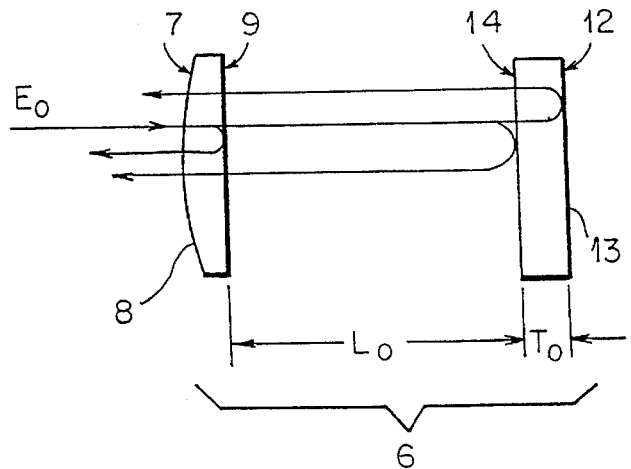
FIG. 2B is an enlarged diagrammatic depiction similar to FIG. 2A in which the spatial orientation of the object 13 has been reversed.

In this first-described procedure, the object is initially imaged from the front (FIG. 2A), and is then flipped or reversed or turned around and imaged from the back (FIG. 2B).

To understand the manner in which this accomplishes the intended result, we begin by multiplying the phase by two so that the modulo $2\pi$ result is not complicated by the $\Phi$ term in Equation 11. We then expand the phase in terms of $h_1$ and $h_2$:

$$2\phi = 2k \cdot ((2-n)h_1 + nh_2 - 2h_r). \qquad \text{Equation 12}$$

When the test object is reversed, several things happen. It should first be noted that it will be extremely difficult to orient the reversed part with precisely the same tilt and piston with respect to the reference surface; we shall therefore define a new $h'_r$, which is the same as the old $h_r$, except for the zero'th and first order variations. Second, the coordinate system is flipped and the origin is shifted. The effects of these changes can be handled by mathematically reflecting the image through the axis of the flip and then relocating the origin by maximizing the overlap of the original and flipped images—as for example using computer software. For simplicity in the mathematical description of this first-described method, it is assumed that the reference surface is perfectly flat and that the camera is entirely free of distortion. Thirdly, and most importantly, the surface height maps are interchanged in accordance with the relationships $$h'_1 = -h_2$$

and $$h'_2 = -h_1. \qquad \text{Equations 13}$$

It is this exchange in height maps that enables attainment of a solution of the problem of calculating the profiles of the front and back surfaces of the transparent test object.

The phase map for the flipped image is $$2\phi' = -2k \cdot (nh_1 + (2-n)h_2 - 2h'_r). \qquad \text{Equation 14}$$

The phase maps $2\phi$ and $2\phi'$ can be independently unwrapped and the tilt and piston terms removed. Since the phase maps are both proportional to linear combinations of the height maps, we may without loss of generality assume that all of the tilt and piston terms are due to the reference maps $h_r$ and $h'_r$. This is equivalent to saying that we can introduce or cancel out any tilt and piston terms in the height maps by simply adjusting the orientation of the test object in a tilt mount. With this simplification, the following system of linear equations may be defined:

$$\frac{\phi}{k} = (2-n) \cdot h_1 + n \cdot h_2$$

$$\frac{\phi'}{k} = -n \cdot h_1 - (2-n) \cdot h_2. \qquad \text{Equations 15}$$

Solving these linear equations for the height maps of the front and rear surfaces of the test object yields:

$$h_1(x,y) = \frac{(2-n) \cdot \phi(x,y) + n \cdot \phi'(x,y)}{4k \cdot (n-1)} \qquad \text{Equation 16}$$

and $$h_2(x,y) = \frac{n \cdot \phi(x,y) + (2-n) \cdot \phi'(x,y)}{4k \cdot (n-1)}. \qquad \text{Equation 17}$$

METHOD 2: THE TRANSMISSION TEST

One way to separate the T and L terms in Equation 11 is to measure the optical thickness nT directly in a separate procedure. A known method of measuring the thickness of a part is by using a so-called transmission test using an auxiliary reference flat 16, as shown in FIG. 4.

To perform the measurement, the test object is inserted into the optical path at an angle such that the primary reflections from its surfaces do not contribute to the interference phenomenon. The measured PSI phase map for the transmission test is $$\phi'' = 2k \cdot (L''_0 - T + nT), \qquad \text{Equation 18}$$

where $L''_0$ is the distance between the two reference flats and the contribution from tilt between the two reference surfaces has been removed. Dropping the piston term and solving for the optical thickness, we obtain $$nT = \frac{n}{n-1} \cdot \frac{\phi''}{2k}. \qquad \text{Equation 19}$$

Algebraically combining Equations 11 and 19 yields the following equations defining the height maps for the front and back surfaces of the test object:

$$h_1(x,y) = \frac{\phi(x,y)}{2k} - \frac{n}{n-1} \cdot \frac{\phi''(x,y)}{4k} \qquad \text{Equation 20}$$

and $$h_2(x,y) = \frac{\phi(x,y)}{2k} - \frac{n+2}{n-1} \cdot \frac{\phi''(x,y)}{4k} \qquad \text{Equation 21}$$

This second test procedure has an advantage over the aforedescribed flip test in that the coordinate system is not changed or disordered in switching from the first to the second configuration or position of the test object. Rather, all that is required is but two small changes in tilt to remove the reflection from the test object and to introduce it from the auxiliary flat located behind the test object.

METHOD 3: THE FRINGE MODULATION TEST

Each of the preceding two methods requires both a change in optical geometry between the two measurements and a relatively precise knowledge of the index of refraction n. For some test objects one or both of these requirements may not, in practice, be achievable. It would be far preferable if it were unnecessary to move or reorient the test object and the quantity nT could be mapped without relying on any a priori knowledge of the index of refraction.

One solution to this difficulty may be to analyze the existing data in another manner so as to directly extract the coefficients $\alpha(nT)$ and $\beta(nT)$ in Equation 6. It will be recalled that these coefficients define the DC offset and modulation depths, respectively. For some test objects, there may be enough information contained in these two coefficients and five frames of phase shifting interferometry intensity data to construct at least an approximate map of nT. As should be apparent, this approach is appreciably more speculative than those heretofore described since it is highly dependent on the kind of test object under consideration and the degree of accuracy required in the resulting surface profiles. Using this third method for a suitable test object, the front and back surface height maps are defined by the equations $$h_1(x,y) = \frac{\phi(x,y) - k \cdot nT(x,y)}{2k} \quad \text{Equation 22}$$

and $$h_2(x,y) = h_1(x,y) + \frac{nT(x,y)}{n} . \quad \text{Equation 23}$$

It will be noted in Equation 22 that the front-surface map does not require any knowledge of the index of refraction, since the quantity nT should be measured directly from the fringe analysis. The back-surface map, however, does require knowledge of the index of refraction. Hence one way to avoid errors due to index variations is to measure the test object twice—first from the front and then from the back.

METHOD 4: THE WAVELENGTH-SHIFT TEST

It will be recalled from Equation 7 (reprinted below, for convenience, as Equation 24) that the background intensity distribution of is also a function of the wavenumber of the source illumination, i.e.

$$\alpha(nT) = 3 + \cos(2k \cdot nT) \quad \text{Equation 24}$$

Thus, one way to map out nT with high accuracy is to perform PSI by wavelength shifting of the source so as to recover the phase $\phi_\alpha$ of the cosine term in Equation 24.

The extent to which the source must be tuned to successfully do so may be readily determined. Phase shifts of $\Delta\phi_\alpha$ require corresponding adjustments $\Delta v$ in the laser source frequency, in accordance with $$\Delta v = \frac{dv}{d\phi} \cdot \Delta\phi_\alpha = \frac{c}{4\pi \cdot nT} \cdot \Delta\phi_\alpha. \quad \text{Equation 25}$$

For the well-known five-bucket PSI algorithm, the total required frequency range is c/2nT. For example, a 5 mm thick BK-7 glass disk requires a source tuning range of approximately 20 GHz. This is well within the tuning range that can be accomplished with laser diodes through straightforward adjustment of the pump current. This kind of measurement should present no problem for glass parts thicker than about 2 mm, particularly where inherently mode-stable lasers, such as the Fujitsu model FLD150F 1.55-m distributed feedback (DFB) laser, are employed. A particularly noteworthy advantage of this fourth, wavelength-shift method is that the test object need not be moved, and there is no sacrifice in accuracy of the resulting surface maps as compared to the first two methods described hereinabove.

For disks thinner than about 2 mm, however, the measurement becomes progressively more difficult to perform using current tuning alone. A 0.5 mm thick hard disk blank requires a 200 GHz tuning range for the conventional five-bucket algorithm. This is beyond the normal tuning range that can be accomplished by current tuning of the laser diodes. Nevertheless, using a DFB laser it is possible to thermally tune the device over this range by using a thermoelectric cooling element which is incorporated into the package for the Fujitsu FLD150F laser.

Thus, in accordance with one embodiment of this fourth method of the invention, an optical thickness map nT(x,y) of the transparent object is first determined as, for example, by employing the arrangement of FIGS. 1 and 2 and using the transmission test of the second method described hereinabove. The determination or calculation of nT(x,y) may be performed in any conventional manner such, for example, by using the well-known five-bucket PSI algorithm. The reference flat or surface is then either removed or reoriented or otherwise adjusted so as to eliminate reflections from the reference surface. The transparent object is next illuminated by the optically-coherent illumination beam of the interferometer, with the object oriented so that the front or first surface of the object faces the illumination source, and the illumination wavelength of the beam is continuously or stepwise varied (through the predetermined range) through a sequence of wavelengths to generate a sequence of interference intensity data sets by reflection of the beam from the front and rear surfaces of the object. A first phase map $\phi_1(x,y)$ is then calculated from the interference intensity data sets using any well-known or otherwise appropriate algorithm. It should be understood that in generating this first phase map $\phi_1(x,y)$, the transparent object is positioned so that the illumination beam impinges first on the front surface, and thereafter on the rear surface, of the object, and so that only the front and rear surfaces of the object (and not the reference flat or surface) contribute to the interference intensity data.

The surface topography $h_1(x,y)$ of the front surface of the object may be determined using nT(x,y) and $\phi_1(x,y)$ and Equations 19 and 20:

$$h_1(x,y) = \frac{\phi_1(x,y)}{2k} - \frac{nT}{2} . \quad \text{Equation 26}$$

The surface topography $h_2(x,y)$ of the rear surface may then be calculated from $$h_2(x,y) = h_1(x,y) + \frac{nT(x,y)}{n} , \quad \text{Equation 27}$$

which obviously requires knowledge of the index of refraction n of the object. That requirement may be eliminated by reorienting the object, as in the above-disclosed "flip test" method, so that the illumination beam impinges first on the rear surface and thereafter on the front surface of the object, and then repeating the variation of the illumination beam wavelength (by which $\phi_1(x,y)$ was generated) to provide a like phase map $\phi_2(x,y)$ from the interference intensity data sets produced by reflection of the beam from the front and rear surfaces of the object in this reoriented position of the object. The surface topography $h_2(x,y)$ of the rear surface of the object may then be calculated from $$h_2(x,y) = \frac{\phi_2(x,y)}{2k} - \frac{nT}{2} , \quad \text{Equation 28}$$

which does not require specific knowledge of the object's index of refraction.

ELIMINATION OF CONTRAST VARIATIONS

For some applications, the ability to accurately map the entire surface without loss of data is critically important. Using conventional apparatus and a fixed-frequency source, it is not possible to recover phase information in regions for which the modulation coefficient in Equation 7 is very small. These regions correspond to areas of low fringe contrast and result in poor signal quality and high phase distortions.

The preferred embodiment of the inventive apparatus depicted in FIG. 1 includes a tunable source and may be used in the practice of any of the four methods hereinabove described to provide complete surface profiles without loss of data. The laser wavelength is adjustable so that any surface region of interest has a sufficiently large modulation coefficient α. Alternatively, a succession of surface measurements taken at different wavelengths may be averaged together to thereby eliminate the effects of low signal contrast. A suitable averaging procedure consists of averaging only the high fringe contrast data points from each surface measurement; the regions of low fringe contrast will vary with wavelength, so that the averaged final result will be free of low-contrast effects.

A GENERAL SOLUTION

So far only the simplest case of three identical, weak reflectors has been considered. Although that discussion has been sufficient to demonstrate the basic principles of the various currently-preferred methods of the invention, it is also within the intended scope and contemplation of the present invention to accommodate more difficult cases or conditions with greater accuracy and flexibility than allowed by heretofore-practiced procedures, while using substantially the same apparatus and measurement procedure as that employed in the simplest case.

The three-wall or surface Fizeau is a special situation presenting a reflection from a layered medium. The approach to this type of problem is to replace the entire system with a single, mathematically equivalent surface having a complex reflectivity $Q(x,y)$. This equivalent surface has the same affect on an incident electric field as does the Fizeau cavity. The fundamental equations of this type of approach may be found in standard texts such as Principles of Optics, by M. Born and E. Wolf (Pergamon Press, N.Y., 1987).

Referring back to FIG. 2A, the object 13 is first mathematically replaced, for purposes of analysis, with an equivalent surface having a reflectivity Z:

$$Z(x,y) = \frac{r_1 + r_2 \cdot \exp(2ik \cdot nT(x,y))}{1 + r_1 r_2 \cdot \exp(2ik \cdot nT(x,y))}.$$  Equation 29

This equation takes into account all of the multiple internal reflections between the front and back surfaces 12, 14 of the test object 13. A similar equation, using Z, is next employed to calculate the reflectivity of the entire three-walled cavity 6 in FIG. 1:

$$Q(x,y) = \frac{r_r + Z(x,y) \cdot \exp(2ik \cdot L(x,y))}{1 + r_r Z(x,y) \cdot \exp(2ik \cdot L(x,y))}.$$  Equation 30

The corresponding measured intensity is proportional to the square modulus of Q:

$$I(x,y) = I_0 \cdot |Q(x,y)|^2.$$  Equation 31

It can be verified that to first order accuracies in the reflectivities, Equation 31 is the equivalent of Equation 6. Accordingly, these more complex equations need be employed only when it is desired to take into account the secondary and higher-order reflections between the front and back surfaces of the test object.

The transmission measurement employed in the second aforedescribed method will also be affected by multiple reflections that may need to be taken into account. The rigorous approach to this problem is the same as that discussed above; i.e. the multiple surfaces are analytically combined into a single surface having a complex effective reflectivity. The effective transmission of the test object is calculated as follows:

$$Z_T(x,y) = \frac{\sqrt{1-r_1^2}\sqrt{1-r_2^2} \cdot \exp(ik \cdot nT(x,y))}{1 + r_1 r_2 \cdot \exp(ik \cdot nT(x,y))}$$  Equation 32

The test object may now be combined with the reflection from the auxiliary flat in the form of an effective reflectivity Z":

$$Z''(x,y) = r_A \cdot Z_T(x,y).$$  Equation 33

It should be noted that the transmission $Z_T$ is squared because the light travels through the test object twice. The new effective reflectivity of the entire optical cavity is therefore $$Q''(x,y) = \frac{r_r + Z''(x,y) \cdot \exp(2ik \cdot L''(x,y))}{1 + r_r Z''(x,y) \cdot \exp(2ik \cdot L''(x,y))},$$  Equation 34 and the intensity map is $$I''(x,y) = I_0 |Q''(x,y)|^2.$$  Equation 35

The length L" in Equation 34 requires some explanation. Since the test object and the auxiliary surface have been effectively incorporated in an imaginary surface having a reflectivity Z", the distance L" includes all of the empty space between the principal and auxiliary reference surfaces but excludes the space taken up by the test object itself. Neglecting any tilt between the reference surfaces, the resulting length is therefore $$L''(x,y) = L''_0 - T(x,y),$$  Equation 36 with respect to which it will be recalled that $L''_0$ defines the average distance between the two reference flats. Here, again, the PSI-measured phase reduces to the simple expression in Equation 18 for the special case of identical low reflectivities.

These general equations demonstrate that there are closed-form solutions to the problem of modeling the interference patterns generated by multiple surfaces in a laser Fizeau cavity, using substantially the same procedures discussed in the four specific measurement methods described hereinabove. The inverse problem of extracting height maps from PSI data to achieve at least an iterative approximation based on perturbations of the weak-reflection limit can also be solved by inverting Equations 31 and 35. For many applications, the first-order equations disclosed in connection with the four specific measurements methods that have been described are themselves sufficient.

AN EXPERIMENTAL DEMONSTRATION

An experimental implementation of a preferred embodiment of the present invention was utilized to quantitatively verify its underlying principles and practical utility. An instrument was constructed substantially in accordance with the arrangement shown in FIG. 1, with the exception of the beam splitter 5 which was omitted; instead, the camera was placed slightly off-center of the optical axis of the Fizeau cavity, thereby permitting separation of the source light and reflected light without the beam splitter. This alternative arrangement is known in the art and is suitable for use only with flat objects. The source 3 was implemented by a tunable, 1.55-m wavelength laser diode.

The object selected for the experimental demonstration was a glass disk approximately 75 mm in diameter and 0.5 mm thick, with a 20 mm hole in the center. Its front and back surfaces were approximately flat and parallel but had small deviations from flatness due to the manner in which the disk had been manufactured and polished. When this test object was illuminated with a conventional, prior art interferometric apparatus, a complex intensity pattern such as that shown in FIG. 3 was observed. This pattern could not be interpreted directly to determine the individual surface profiles of the front and back sides of the object.

Figure 5A:
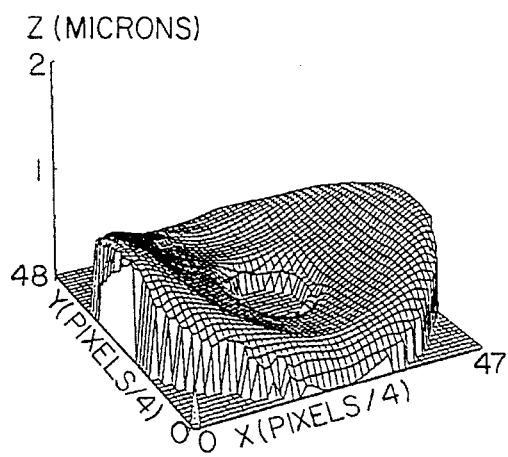
FIGS. 5A and 5B are graphical representations of surface height maps of the front and back surfaces, respectively, of a transparent disk, as measured by conventional, prior-art interferometric procedures using an index-matching coating alternately applied to the front and back surfaces of the disk.
Figure 5B:
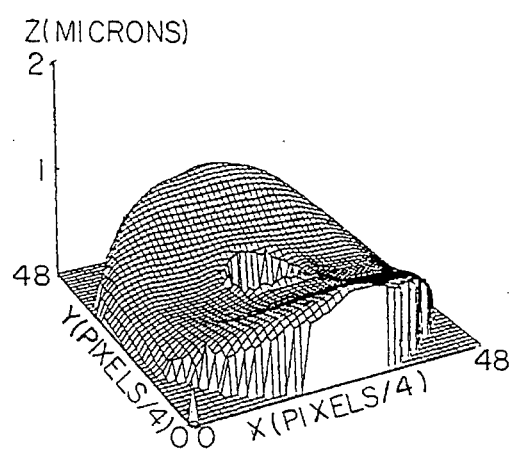

In a preliminary experiment, the front and back surfaces were measured using prior art techniques for reducing the effects of multiple reflections; that is, by coating one surface with an index-matching material before the measurement, and then repeating the procedure for the other surface. These measurements were performed using a Zygo Mark IV instrument (manufactured by Zygo Corporation, Middlefield, Conn.) which is a high-quality commercial interferometer with a HeNe laser source. The resulting surface maps, shown in Fig. 5, may be considered to be accurate representations of the surface profiles of the test object.

Figure 6A:
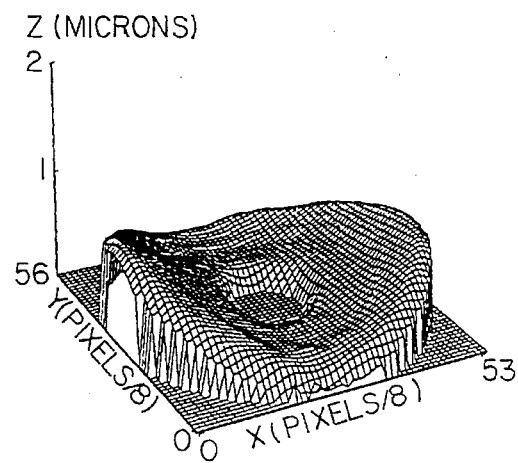
FIGS. 6A and 6B are graphical representations of surface height maps of the front and back surfaces, respectively, of the same transparent disk with which the maps of FIGS. 5A and 5B were made, generated in accordance with one method of the present invention.
Figure 6B:
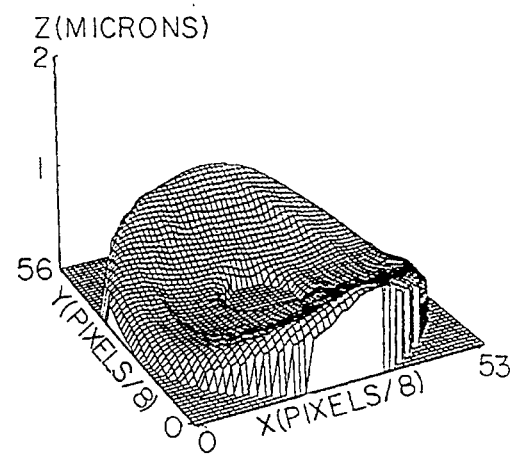

The object was then measured using the inventive method and apparatus. In accordance with the flip-test method taught in this disclosure, phase images were obtained by PSI for the object first in one position, with the front side facing the instrument (FIG. 2A), and then in a second position, with the back side facing the instrument (FIG. 2B). Equations 16 and 17 were then applied to the phase maps $\phi(x,y)$ and $\phi'(x,y)$ to generate the surface height profiles. This procedure was next repeated at a different wavelength to remove regions of low fringe contrast, as taught in the foregoing section titled Elimination Of Contrast Variations. The final results, depicted in FIG. 6, evidence excellent agreement with the conventionally-obtained height maps shown in FIG. 5, any differences being due primarily to the single-reflection approximation of the equations employed. The peak-to-valley and rms statistical results for the method and apparatus of the present invention are within 0.01-m of the prior art technique, without the inconvenience of having to treat the surfaces of the object before performing the interferometric measurements.

CONCLUSIONS

The foregoing discussion and experiments demonstrate that the inventive method and apparatus may be employed to generated highly accurate surface height information from interferograms of flat, transparent objects without having to first treat the surfaces of the objects. Four different and viable methodologies for obtaining such measurements using laser-based Fizeau interferometers have, by way of example, been disclosed. Straightforward and readily performed modifications of the optical geometry, such as the addition of transmission spheres commonly used in the art, will additionally enable metrology of transparent objects suffering from multiple reflections from approximately concentric spherical surfaces. Numerous other modifications will likewise be apparent to those skilled in the art with knowledge of this disclosure.

Thus, while there have shown and described and pointed out fundamental novel features of the invention as applied to several preferred embodiments thereof, it will be understood that various omissions and substitutions and changes in the form and details of the devices illustrated, in their operation, and in the methods herein described, may be made by those skilled in the art without departing from the spirit of the invention. It is the intention, therefore, to be limited only as indicated by the scope of the claims appended hereto.

What is claimed is:

1. A method of measuring the surface topography of each of opposed front and rear surfaces of a substantially transparent object without first treating at least one of the surfaces to reduce reflections from the at least one surface, comprising the steps of:

(a) positioning the object in a first orientation defining a first measurement geometry;

(b) directing an optically-coherent illumination beam of a first wavelength onto the front surface of the object positioned in said first orientation so as to reflect the illumination beam from the front surface and generate, using phase shifting interferometry, a first phase map of the object formed by a mixture of reflections of the illumination beam from the front surface and of reflections from the rear surface of at least a portion of the illumination beam that has passed through the substantially transparent object and been reflected back through the object from the rear surface;

(c) after generating said first phase map, performing a measurement-geometry modification from said first to a second measurement geometry by changing said first orientation of the object to a second orientation of the object;

(d) generating, using phase shifting interferometry, a second phase map of the object by illuminating the object in said second measurement geometry, said second phase map being formed by a mixture of reflections from the first and second surfaces of the object; and (e) calculating the surface topography of each of said front and rear surfaces of the object from said first and second phase maps.

2. A method in accordance with claim 1, wherein said step (c) comprises reorienting the object to said second orientation by reversing said first orientation of the object to thereby exchange relative orientations of the front and rear surfaces, and wherein said step (d) comprises directing the optically-coherent illumination beam of said first wavelength onto the rear surface of the object positioned in said second orientation so as to reflect the illumination beam from said object rear surface and interferometrically generate said second phase map formed by said mixture of reflections of the illumination beam from the rear surface and reflections from the front surface of at least a portion of the illumination beam that has passed through the substantially transparent object and been reflected back through the object from the front surface.

3. A method in accordance with claim 2, wherein said calculated surface topographies of said front and rear surfaces comprise first topographies of said front and rear surfaces, further comprising the steps of:

(f) repeating said step (b) using an optically-coherent illumination beam of a second wavelength to generate a third phase map of the object by phase shifting interferometry;

(g) repeating said step (d) using the optically-coherent illumination beam of said third wavelength to interferometrically generate a fourth phase map of the object;

(h) calculating a second surface topography of each of said from and rear surfaces of the object from said third and fourth phase maps;

(i) averaging said first and second calculated topographies of said front surface to obtain an enhanced-accuracy surface topography of said front surface of the object; and (j) averaging said first and second calculated topographies of said rear surface to obtain an enhanced-accuracy surface topography of said rear surface of the object.

4. A method in accordance with claim 3, wherein said step (i) further comprises averaging high fringe contrast data points from said calculated first and second topographies of said front surface to obtain said enhanced-accuracy surface topography of said from surface of the object, and wherein said step (j) further comprises averaging high fringe contrast data points from said calculated first and second topographies of said rear surface to obtain said enhanced-accuracy surface topography of said rear surface of the object.

5. A method in accordance with claim 2, wherein said step (a) further comprises positioning the object so that said from surface faces a direction from which the illumination beam reflectively impinges on the object, and said step (c) further comprises reorienting the object so that said rear surface faces the direction from which the illumination beam reflectively impinges on the object.

6. A method in accordance with claim 5, wherein said step (e) comprises calculating the surface topographies $h_1(x,y)$ and $h_2(x,y)$ of said front and rear surfaces from:

$$h_1(x,y) = -\frac{(2-n) \cdot \phi_1(x,y) + n \cdot \phi_2(x,y)}{4k \cdot (n-1)}$$

and $$h_2(x,y) = \frac{n \cdot \phi_1(x,y) + (2-n) \cdot \phi_2(x,y)}{4k \cdot (n-1)},$$

where $\phi_1(x,y)$ and $\phi_2(x,y)$ are the phase maps of the front and rear surfaces of the object, n is a refraction index of the object and k is an illumination wavenumber.

7. A method in accordance with claim 6, wherein said first and second phase maps are calculated from interference intensity patterns measured on a detector, and wherein said step (c) further comprises adjusting said second orientation of the object so that the first phase map interference intensity patterns and the second phase map interference intensity patterns impinge on corresponding locations on the detector.

8. A method in accordance with claim 2, wherein said steps (b) and (d) further comprise interferometrically-generating said first and second phase maps using a Fizeau-type interferometer apparatus.

9. A method in accordance with claim 1, wherein said step (b) further comprises interferometrically-generating said first phase map by directing said illumination beam onto the front surface of the object through a first reference flat, and wherein said step (c) further comprises adding a second reference flat in opposed relation to said object rear surface so that an illumination beam directed onto said object front surface passes through said first reference flat, then through said object and then onto said second reference flat to thereby define said second measurement geometry, and said step (d) further comprises directing the optically-coherent beam of said first wavelength onto the front surface of the object positioned in said second measurement geometry to generate said second phase map.

10. A method in accordance with claim 9, wherein said calculated surface topographies of said front and rear surfaces comprise first topographies of said front and rear surfaces, further comprising the steps of:

(f) repeating said step (b) using an optically-coherent illumination beam of a third wavelength to generate a third phase map of the object by phase shifting interferometry;

(g) repeating said step (d) using the optically-coherent illumination beam of said third wavelength to interferometrically generate a fourth phase map of the object;

(h) calculating a second surface topography of each of said front and rear surfaces of the object from said third and fourth phase maps;

(i) averaging said first and second calculated topographies of said front surface to obtain an enhanced-accuracy surface topography of said from surface of the object; and (j) averaging said first and second calculated topographies of said rear surface to obtain an enhanced-accuracy surface topography of said rear surface of the object.

11. A method in accordance with claim 10, wherein said step (i) further comprises averaging high fringe contrast data points from said calculated first and second topographies of said front surface to obtain said enhanced-accuracy surface topography of said front surface of the object, and where said step (j) further comprises averaging high fringe contrast data points from said calculated first and second topographies of said rear surface to obtain said enhanced-accuracy surface topography of said rear surface of the object.

12. A method in accordance with claim 9 wherein the object is positioned, in each of said first and second measurement geometries, so that said front surface faces a direction from which the illumination beam reflectively impinges on the object.

13. A method in accordance with claim 12, wherein said step (e) comprises calculating the surface topographies $h_1(x,y)$ and $h_2(x,y)$ of said front and rear surfaces from:

$$h_1(x,y) = \frac{\phi_1(x,y)}{2k} - \frac{n}{n-1} \cdot \frac{\phi_2(x,y)}{4k}$$

and $$h_2(x,y) = \frac{\phi_1(x,y)}{2k} - \frac{n+2}{n-1} \cdot \frac{\phi_2(x,y)}{4k},$$

where $\phi_1(x,y)$ and $\phi_2(x,y)$ are the phase maps of the front and rear surfaces of the object, n is a refraction index of the object and k is an illumination wavenumber.

14. A method in accordance with claim 13, wherein said step (c) further comprises adjusting an angular orientation of the object in said second measurement geometry to minimize reflections of the illumination beam from said object in said step (d) so that said second phase map is generated primarily by reflections from said second reference flat.

15. A method in accordance with claim 2, further comprising the step of (f) determining an optical thickness nT of the object; and wherein said step (e) comprises calculating the surface topography of each of said front and rear surfaces of the object from said first and second phase maps and the optical thickness nT of the object.

16. A method in accordance with claim 15, wherein said step (f) further comprises determining said optical thickness nT of the object by analyzing DC offset and modulation depth data produced in generating at least one of said first and second phase maps.

17. A method in accordance with claim 15, wherein said step (f) further comprises determining an optical thickness map nT(x,y) of the object, and wherein said step (e) comprises calculating the surface topographies $h_1(x,y)$ and $h_2(x,y)$ of said front and rear surfaces from:

$$h_1(x,y) = \frac{\phi_1(x,y) - k \cdot nT(x,y)}{2k}$$

and

-continued $$h_2(x,y) = \frac{\phi_2(x,y) - k \cdot nT(x,y)}{2k},$$

where $\phi_1(x,y)$ and $\phi_2(x,y)$ are the phase maps of the front and rear surfaces of the object, and k is an illumination wavenumber.

18. A method in accordance with claim 15, wherein said calculated surface topographies of said front and rear surfaces comprise first topographies of said from and rear surfaces, further comprising the steps of:

(g) repeating said step (b) using an optically-coherent illumination beam of a second wavelength to generate a third reflection wavefront by phase shifting interferometry and measuring a third intensity pattern produced by said third reflection wavefront;

(h) repeating said step (d) using the optically-coherent illumination beam of said second wavelength to interferometrically generate a fourth reflection wavefront and measuring a fourth intensity pattern produced by said fourth reflection wavefront;

(i) calculating a second surface topography of each of said front and rear surfaces of the object from said measured third and fourth intensity patterns;

(j) averaging said first and second calculated topographies of said front surface to obtain an enhanced-accuracy surface topography of said front surface of the object; and (k) averaging said first and second calculated topographies of said rear surface to obtain an enhanced-accuracy surface topography of said rear surface of the object.

19. A method in accordance with claim 18, wherein said step (j) further comprises averaging high fringe contrast data points from said calculated first and second topographies of said front surface to obtain said enhanced-accuracy surface topography of said front surface of the object, and where said step (k) further comprises averaging high fringe contrast data points from said calculated first and second topographies of said rear surface to obtain said enhanced-accuracy surface topography of said rear surface of the object.

20. A method of measuring the surface topography of each of opposed front and rear surfaces of a substantially transparent object without first treating at least one of the surfaces to reduce reflections from the at least one surface, comprising the steps of:

(a) positioning the object in a first orientation defining a first measurement geometry;

(b) directing an optically-coherent illumination beam of a first wavelength onto the front surface of the object positioned in said first orientation so as to reflect the illumination beam from the front surface and generate, using phase shifting interferometry, a first phase map of the object formed by a mixture of reflections of the illumination beam from the front surface and of reflections from the rear surface of at least a portion of the illumination beam that has passed through the substantially transparent object and been reflected back through the object from the rear surface;

(c) after generating said first phase map, performing a measurement-geometry modification from said first to a second measurement geometry by changing said illumination beam wavelength from said first wavelength to at least a second wavelength of the illumination beam;

(d) generating, using phase shifting interferometry, a second phase map of the object by illuminating the object in said second measurement geometry, said second phase map being formed by a mixture of reflections from the first and second surfaces of the object; and (e) calculating the surface topography of each of said front and rear surfaces of the object from said first and second phase maps;

wherein said step (a) comprises positioning the object in said first orientation for movement relative to a reference surface; wherein said step (b) further comprises reflecting the illumination beam from the front surface and from the reference surface and relatively moving one of the object and the reference surface to generate first interference intensity data from which said first phase map is calculated; further comprising the step of (f) determining an optical thickness map nT(x,y) of the object using said first interference intensity data; wherein said step (c) further comprises modifying said first measurement geometry by substantially eliminating reflections from the reference surface to define said second measurement geometry of the object; wherein said step (d) further comprises illuminating the object in said second measurement geometry with said second wavelength illumination beam, and predeterminately varying the wavelength of said illumination beam through a sequence of wavelengths between said second wavelength and a third wavelength to generate a sequence of second interference intensity data by reflection of said wavelength-varying illumination beam from said front and rear surfaces of the object and to provide from said second interference intensity data a second phase map of the object using phase shifting interferometry; and wherein said step (e) further comprises calculating the surface topography of each of said front and rear surfaces of the object from said second phase map and said optical thickness map.

21. A method in accordance with claim 20, wherein said step (e) comprises calculating the surface topographies $h_1(x,y)$ and $h_2(x,y)$ of said front and rear surfaces of the object from $$h_1(x,y) = \frac{\phi(x,y)}{2k} - \frac{nT(x,y)}{2}$$

and $$h_2(x,y) = h_1(x,y) + \frac{nT(x,y)}{n},$$

where $\phi(x,y)$ is the second phase map, k is an illumination wavenumber of the illumination beam and n is a refraction index of the object.

22. A method in accordance with claim 20, further comprising the step of (f) determining an approximation T of the thickness of the object by gross measurement of a thickness of the object between the front and rear surfaces, and wherein a range $\Delta v$ of said predetermined variation of the illumination wavelength of the illumination beam from said second wavelength $v_2$ to said third wavelength $v_3$ is defined by $$\Delta v = v_3 - v_2 = \frac{c}{2T}$$

wherein c is the speed of light.

23. A method in accordance with claim 20, wherein in said second measurement geometry the object is positioned so that the second illumination beam is reflected from the front surface of the object before being reflected from the rear surface of the object; further comprising the steps of:

(g) modifying said second measurement geometry to define a third measurement geometry of the object in which the illumination beam is reflected from the rear surface of the object before being reflected from the front surface of the object; and (h) repeating said step (d) with said object in said third measurement geometry to generate a sequence of third interference intensity data by reflection of said wavelength-varying illumination beam from said front and rear surfaces of the object and to provide from said sequence of third interference intensity data a third phase map of the object using phase shifting interferometry; and wherein said step (f) comprises calculating the surface topographies $h_1(x,y)$ and $h_2(x,y)$ of said first and second surfaces from $$h_1(x,y) = \frac{\phi_2(x,y)}{2k} - \frac{nT(x,y)}{2}$$

and $$h_2(x,y) = \frac{\phi_3(x,y)}{2k} - \frac{nT(x,y)}{2},$$

where $\phi_2(x,y)$ is the second phase map, $\phi_3(x,y)$ is the third phase map and k is an illumination wavenumber of the second illumination beam.

24. A method in accordance with claim 23, wherein said object is positioned in said second measurement geometry so that said front surface faces a direction from which the second illumination beam impinges on the object, and wherein said step (g) further comprises reorienting the object so that said rear surface faces the direction from which the second illumination beam reflectively impinges on the object.

25. A method of measuring the surface topography of each of opposed first and second surfaces of a substantially transparent object without first treating at least one of the surfaces to reduce reflections from the at least one surface, comprising the steps of:

(a) positioning the object in a first orientation for movement relative to a reference surface and defining a first measurement geometry;

(b) directing a first optically-coherent illumination beam of a first wavelength onto the first surface of the object positioned in said first orientation so as to reflect the illumination beam from the first surface and from the reference surface, and relatively moving one of the object and the reference surface to generate first interference intensity data defined by a mixture of reflections of the first illumination beam from the first surface and of reflections from the second surface of at least a portion of the first illumination beam that has passed through the substantially transparent object and been reflected back through the object from the second surface and to provide from said first interference intensity data a first phase map of the object using phase shifting interferometry;

(c) determining an optical thickness map nT(x,y) of the object using said first interference intensity data produced in generating said first phase map;

(d) modifying said first measurement geometry by substantially eliminating reflections from the reference surface to define a second measurement geometry of the object;

(e) illuminating the object in said second measurement geometry with a second optically-coherent illumination beam, and predeterminately varying an illumination wavelength of the second illumination beam through a sequence of wavelengths between a second wavelength and a third wavelength to generate a sequence of second interference intensity data by reflection of said wavelength-varying second illumination beam from said first and second surfaces of the object and to provide from said sequence of second interference intensity data a second phase map of the object using phase shifting interferometry, said second interference intensity data being defined by a mixture of reflections of the second illumination beam from the first and second surfaces of the object; and (f) calculating the surface topography of each of said first and second surfaces of the object from said second phase map and said optical thickness map determined in said step (c).

26. A method in accordance with claim 25, wherein said step (f) comprises calculating the surface topographies $h_1(x,y)$ and $h_2(x,y)$ Of said first and second surfaces from $$h_1(x,y) = \frac{\phi(x,y)}{2k} - \frac{nT(x,y)}{2}$$

and $$h_2(x,y) = h_1(x,y) + \frac{nT(x,y)}{n},$$

where $\phi(x,y)$ is the second phase map, k is an illumination wavenumber of the second illumination beam and n is a refraction index of the object.

27. A method in accordance with claim 25, further comprising the step of (g) determining an approximation T of the thickness of the object by gross measurement of a thickness of the object between the first and second surfaces, and wherein a range $\Delta v$ of said predetermined variation of the illumination wavelength of the second illumination beam from said second wavelength $v_2$ to said third wavelength $v_3$ is defined by $$\Delta v = v_3 - v_2 = \frac{c}{2T}$$

wherein c is the speed of light.

28. A method in accordance with claim 25, wherein in said second measurement geometry the object is positioned so that the second illumination beam is reflected from the first surface of the object before being reflected from the second surface of the object; further comprising the steps of:

(g) modifying said second measurement geometry to define a third measurement geometry of the object in which the second illumination beam is reflected from the second surface of the object before being reflected from the first surface of the object; and (h) repeating said step (e) with said object in said third measurement geometry to generate a sequence of third interference intensity data by reflection of said wavelength-varying second illumination beam from said first and second surfaces of the object and to provide from said sequence of third interference intensity data a third phase map of the object using phase shifting interferometry; and wherein said step (f) comprises calculating the surface topographies $h_1(x,y)$ and $h_2(x,y)$ of said first and second surfaces from $$h_1(x,y) = \frac{\phi_2(x,y)}{2k} - \frac{nT(x,y)}{2}$$

and $$h_2(x,y) = \frac{\phi_3(x,y)}{2k} - \frac{nT(x,y)}{2},$$

where $\phi_2(x,y)$ is the third phase map and k is an illumination wavenumber of the second illumination beam.

29. A method in accordance with claim 28, wherein said object is positioned in a first orientation in said second measurement geometry, and wherein said step (g) further comprises reorienting the object by reversing said first orientation of the object.

30. A method in accordance with claim 28, wherein said object is positioned in a first orientation in said second measurement geometry so that said first surface faces a direction from which the second illumination beam impinges on the object, and wherein said step (g) further comprises reorienting the object so that said second surface faces the direction from which the second illumination beam reflectively impinges on the object.

31. A method in accordance with claim 25, wherein said second illumination wavelength is the same as said first illumination wavelength.

\* \* \* \* \*